(12) United States Patent
Bartlett

(10) Patent No.: US 6,539,514 B1
(45) Date of Patent: Mar. 25, 2003

(54) READ WHILE WRITE METHOD IN DATA STORAGE DEVICE

(75) Inventor: Paul Frederick Bartlett, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/310,407

(22) Filed: May 12, 1999

(30) Foreign Application Priority Data

May 12, 1998 (EP) ............................................. 98303691

(51) Int. Cl.$^7$ ...................... H03M 13/00; G11C 29/00; G11B 5/09
(52) U.S. Cl. .................. 714/761; 714/54; 714/763; 360/48; 360/49; 360/53
(58) Field of Search ..................... 714/761, 2, 719, 714/736, 54, 763; 360/31, 53, 64, 48, 49, 74.6, 77.13, 95, 130.21

(56) References Cited

U.S. PATENT DOCUMENTS

| | | | |
|---|---|---|---|
| 4,637,023 A | | 1/1987 | Lounsbury et al. ............ 714/54 |
| 5,293,285 A | * | 3/1994 | Leonhardt et al. ............. 360/95 |
| 5,499,147 A | | 3/1996 | Tsai et al. ...................... 360/53 |
| 5,576,903 A | * | 11/1996 | Brown et al. .................. 360/48 |
| 6,018,434 A | * | 1/2000 | Saliba ...................... 360/77.13 |

FOREIGN PATENT DOCUMENTS

| | | |
|---|---|---|
| EP | 0 793 228 A1 | 9/1997 |
| WO | WO 89/00312 | 1/1989 |

OTHER PUBLICATIONS

"New 8mm Is Ideal For Automated Storage," Computer Technology Review, 11(1991)Mar., No. 3, Los Angeles, CA, US.

* cited by examiner

Primary Examiner—Emmanuel L. Moise

(57) ABSTRACT

Data are simultaneously written to plural tracks of a magnetic tape storage device while preventing elongated tape scratches from corrupting data blocks. A byte stream of user data is arranged into plural codewords that are distributed amongst plural heads that write the codewords to the plural tracks. When the data are read from the plural tracks, data are verified as being written to the tape successfully. If not, codewords are distributed amongst the plural read/write heads in a different order and re-written data to the tape.

18 Claims, 8 Drawing Sheets

| 500 | 501 | 510 | 511 |
|---|---|---|---|
| Codeword Pair Header | First Codeword Pair | Codeword Pair Header | Second Codeword Pair |

Fig. 5

| 0 | 9 | 18 | 27 | 36 | 45 | 54 | 63 | 64 | 82 | .. | 438 | 447 | 448 | 457 | 466 | 475 | 484 | 493 | 502 | 511 |
|---|---|---|---|---|---|---|---|---|---|---|---|---|---|---|---|---|---|---|---|---|
| 1 | 10 | 19 | 28 | 37 | 46 | 55 | 56 | 65 | 83 | .. | 439 | 440 | 449 | 458 | 467 | 476 | 485 | 494 | 503 | 504 |
| 2 | 11 | 20 | 29 | 38 | 47 | 48 | 57 | 66 | 84 | .. | 432 | 441 | 450 | 459 | 468 | 477 | 486 | 495 | 496 | 505 |
| 3 | 12 | 21 | 30 | 39 | 40 | 49 | 58 | 67 | 85 | .. | 433 | 442 | 451 | 460 | 469 | 478 | 487 | 488 | 497 | 506 |
| 4 | 13 | 22 | 31 | 32 | 41 | 50 | 59 | 68 | 86 | .. | 434 | 443 | 452 | 461 | 470 | 479 | 480 | 489 | 498 | 507 |
| 5 | 14 | 23 | 24 | 33 | 42 | 51 | 60 | 69 | 87 | .. | 435 | 444 | 453 | 462 | 471 | 472 | 481 | 490 | 499 | 508 |
| 6 | 15 | 16 | 25 | 34 | 43 | 52 | 61 | 70 | 80 | .. | 436 | 445 | 454 | 463 | 464 | 473 | 482 | 491 | 500 | 509 |
| 7 | 8 | 17 | 26 | 35 | 44 | 53 | 62 | 71 | 81 | .. | 437 | 446 | 455 | 456 | 465 | 474 | 483 | 492 | 501 | 510 |

Fig. 6

| Trk | W N | 0 0ˣ | 0 1 | 0 2 | 1 0'ˣ | 1 3ˣ | 1 4 | 2 0" | 2 3ˣ | 2 5 | 2 6 | 3 3" | 3 7 | 3 8 | 3 9 |
|---|---|---|---|---|---|---|---|---|---|---|---|---|---|---|---|
| 0 | | 0 | 9 | 18 | 1' | 27 | 36 | 2" | 29' | 45 | 54 | 30" | 63 | 64 | 27 |
| 1 | | 1 | 10 | 19 | 2' | 28 | 37 | 3" | 30' | 46 | 55 | 31" | 56 | 65 | 74 |
| 2 | | 2 | 11 | 20 | 3' | 29 | 38 | 4" | 31' | 47 | 48 | 24" | 57 | 66 | 75 |
| 3 | | 3 | 12 | 21 | 4' | 30 | 39 | 5" | 24' | 40 | 49 | 25" | 58 | 67 | 76 |
| 4 | | 4 | 13 | 22 | 5' | 31 | 32 | 6" | 25' | 41 | 50 | 26" | 59 | 68 | 77 |
| 5 | | 5 | 14 | 23 | 6' | 24 | 33 | 7" | 26' | 42 | 51 | 27" | 60 | 69 | 78 |
| 6 | | 6 | 15 | 16 | 7' | 25 | 34 | 0" | 27' | 43 | 52 | 28" | 61 | 70 | 79 |
| 7 | | 7 | 8 | 17 | 0 | 26 | 35 | 1" | 28' | 44 | 53 | 29" | 62 | 71 | 72 |

Fig. 9

READ WHILE WRITE METHOD IN DATA STORAGE DEVICE

FIELD OF THE INVENTION

The present invention relates to data storage devices and in particular although not exclusively to tape data storage devices having a capability of writing data simultaneously to a plurality of tracks.

BACKGROUND TO THE INVENTION

In order to store digital electronic data, it is known to use magnetic tape data cartridges which are inserted into a tape drive unit having a plurality of read/write heads. Typically such magnetic tape storage devices may be used to back up data generated by a host device, e.g. a computer.

As the drive for greater data storage capacity necessitates narrower tracks on linear tape data storage devices, individual codewords are at greater risk of being corrupted during the write to tape process due to, for example, a scratch on the magnetic coating of a tape storage medium.

It is known in tape storage devices to configure the write and read heads such that data written to tape can immediately be read back from tape to verify whether or not the data has become corrupted during the writing process. In the case of discrete blocks of data associated with, for example, the output of a computer, it may be possible to rewrite the corrupted codewords detected.

However, simply rewriting one bad block of a plurality of codewords that may be written to tape simultaneously using a plurality of read/write heads would necessitate that any subsequent codewords recorded on tape would need to be reordered. In addition, as the number of rewrite operations increases so the reordering of subsequently written data would become increasingly complex.

SUMMARY OF THE INVENTION

The specific embodiments and methods according to the present invention aim to improve the writing of data in high data density tape systems having a plurality of read/write heads, and thereby improving the reliability of such devices.

Specific methods according to the present invention, recognize that if corrupted data is re-written to a plurality of tracks in a different track order to that of a previously written version of the data, then data previously effected by surface damage can be written to tape successfully.

According to a first aspect of the present invention there is provided a method of writing data to a data storage medium. The method comprises the steps of:

partitioning the data into a plurality of codewords;

distributing the codewords amongst a plurality of write heads which write on a plurality of physical tracks of the data storage medium;

performing a write operation to write the codewords substantially simultaneously to the same plurality of physical tracks of the data storage medium;

performing a read operation to read the codewords from the plurality of physical tracks;

if the codewords read from the plurality of tracks contain errors, then re-distributing the codewords originally written to the data storage medium in a different order amongst the plurality of write heads; and performing a rewrite operation to rewrite the redistributed Codewords to the same plurality of physical tracks of the data storage medium.

Preferably, the data storage medium comprises an elongate tape, and the write operation comprises a write pass along a length of the tape.

The step of distributing codewords amongst a plurality of write heads preferably comprises distributing a plurality of Codeword Quads amongst the plurality of write heads. A set of four codewords is termed a Codeword Quad herein.

Preferably each of the plurality of Codeword Quads is allocated to a corresponding write head.

Preferably, the step of performing a write operation comprises simultaneously writing the plurality of Codeword Quads onto the data storage medium through the write heads.

The plurality of Codeword Quads may be arranged into a logical track block for writing to the data storage medium simultaneously, and the position of an individual Codeword Quad within the logical track block is indicated by an integer number.

A plurality of the Codeword Quads to be written simultaneously may be arranged into a logical track block;

the Codeword Quads of each of the logical track blocks may be allocated to corresponding ones of the plurality of write heads in a first order, and if an error is detected in the Codeword Quads once written to the data storage medium, the Codeword Quads of the logical track block are re-allocated to the write heads in the different order.

Preferably, the position of the Codeword Quads within the logical track block is denoted by an integer number.

Preferably, each of the Codeword Quads of the logical track block corresponds with a respective one of the plurality of write heads.

The first order may be determined by the expression:

$$\text{Track\_Number} = \text{Mod}\left[\frac{(\text{CQ\_Number} - \text{Mod}(\text{CQ\_Number}, \text{N\_T}))}{\text{N\_T}}, \text{N\_T}\right]$$

where the Track_Number represents a number of an element of a logical track block, CQ_Number represents a number of a set of four codewords, Mod represents the integer remainder of a modulo division; and N_T represents the number of simultaneously written tracks.

The different order may be determined by an expression:

$$\text{Track\_Number} = \text{Mod}\left[\frac{(\text{CQ\_Number} - \text{Mod}(\text{CQ\_Number}, \text{N\_T}))}{\text{N\_T}} - W, \text{N\_T}\right]$$

where Track_Number represents a number of an element of a logical track block, CQ_Number represents the number of a set of four codewords, Mod represents the integer remainder of a modulo division; W represents the state of a character which cycles through a sequence of integers 0 to M−1, where M represents the number of active tracks which can be written to simultaneously; and N_T represents the number of tracks simultaneously written.

Preferably, the data storage medium comprises a magnetic data storage medium, for example a cassette tape cartridge comprising an elongate band of tape wound about a reel.

The invention includes a data storage device comprising at least one read element and at least one write element The device comprises means capable of writing data to a data storage medium and means capable of reading the written data from the data storage medium, wherein:

the write means is operable to partition the data into a plurality of codewords;

the write means is operable to distribute the codewords amongst a plurality of write heads;

the write means is operable to perform a write operation to write the codewords substantially simultaneously to a plurality of physical tracks of the data storage medium;

the read means is operable to perform a read operation to read the codewords from the plurality of physical tracks;

if the codewords read from the plurality of tracks are incomplete, then the device is operable to redistribute the codewords originally written to the data storage medium in a different order amongst the plurality of write heads; and the device is operable to perform a re-write operation to re-write the re-distributed codewords to the same plurality of physical tracks of the data storage medium.

The invention includes a data storage medium comprising a plurality of codewords in a plurality of track blocks. Each of the track blocks comprises a plurality of codewords. A plurality of codewords belonging to a first logical track block are in a set of tracks in a first order. If the plurality of codewords have been erroneously written at the first position occupied by the logical track block, the plurality of codewords are in the plurality of tracks in a second order, at a second position on the plurality of tracks.

The data storage medium optimally comprises a magnetic tape data storage medium.

The invention includes a method of rewriting corrupt data which protects against the effects of extended data to the storage medium.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 5 illustrates schematically the layout of a single block of process data from a host apparatus in the form in which it is allocated to a track of a magnetic tape storage medium according to a specific implementation of the present invention;

FIG. 6 illustrates schematically how the process codewords of a complete data set are allocated to a plurality of tracks of a magnetic tape storage medium according to a specific implementation of the present invention;

FIG. 9 illustrates schematically an example of how codewords are allocated to tracks of a tape storage medium where bad blocks have been rewritten to tape according to the specific implementation of the present invention.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention described herein are aimed at magnetic tape recording devices having a substantially static read/write head in which an elongate tape is drawn past the head at relatively high speed, for example of the order 3 meters per second.

Reading and writing of data onto the tape may be carried out in both forward and reverse pass directions of the tape relative to the head, and a plurality of parallel data tracks may be read or recorded onto the tape simultaneously using a read/write head comprising a plurality of spaced apart read/write elements. However, the general methods disclosed and as identified in the claims herein, are not limited to static head devices or devices having high tape speeds.

In the following description a specific embodiment having 8 tracks simultaneously written to will be described. However, it will be recognized by the skilled person that the general methods disclosed herein may be applied generally to other track formats in which 2, 4, 16 or other numbers of tracks are written simultaneously.

Figure 1:
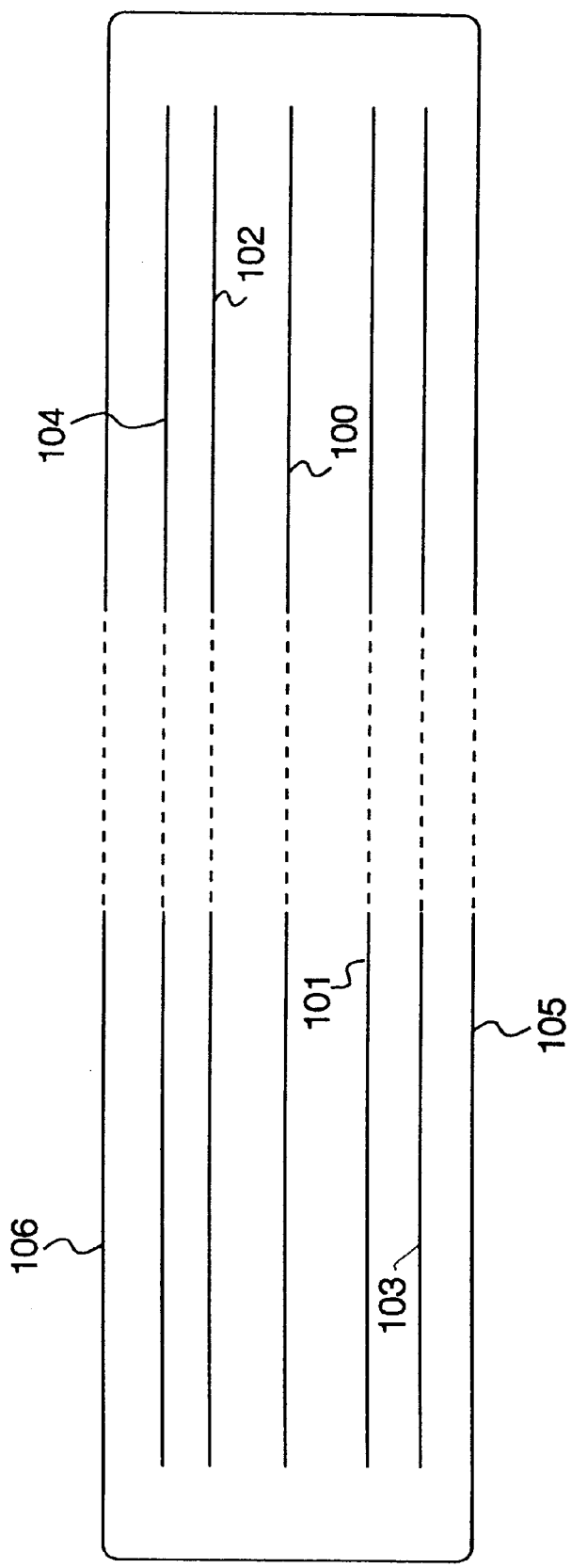
FIG. 1 illustrates schematically a plurality of paths taken by a read/write head relative to an elongate band of magnetic tape material according to a specific method of the present invention.

Referring to FIG. 1 herein, there is illustrated schematically a physical layout of data recorded along an elongate band of magnetic tape by a read/write head of a magnetic data recording device as the tape is drawn past the head. The read/write head contains a plurality of read elements and a plurality of write elements arranged to read or write a plurality of physical tracks of data along a tape simultaneously, resulting in physical tracks 100, 104 which are recorded parallel to each other along the length of the tape. The plurality of read/write elements are spaced apart from each other in a direction transverse to the direction of the tape, typically by a distance of the order 200 $\mu$m. Each read/write element is capable of reading or writing a physical track of width of the order 20 $\mu$m or so. The read/write head records a plurality of band routes along the tape in a path shown in FIG. 1 herein. Each band route contains a plurality of bands, each band comprising a plurality of physically recorded data tracks. Substantially a complete length of the tape is wound past the static read/write head in a single pass.

Ideally the tape winds its whole full length from a first end to a second end of the tape during a "pass" of the tape past the read/write head. In this specification a "write pass" is defined as a single passage of the tape past a write head for writing onto a single track, irrespective of whether the tape speed varies, or whether the tape stops during a pass. During a back up operation, the tape may traverse the read/write head in forward and reverse directions a number of different times, in a plurality of different write passes. A write pass may comprise a sequence of writes which cause data to be written sequentially along one or more tracks, which are themselves written in sequence.

Figure 2:
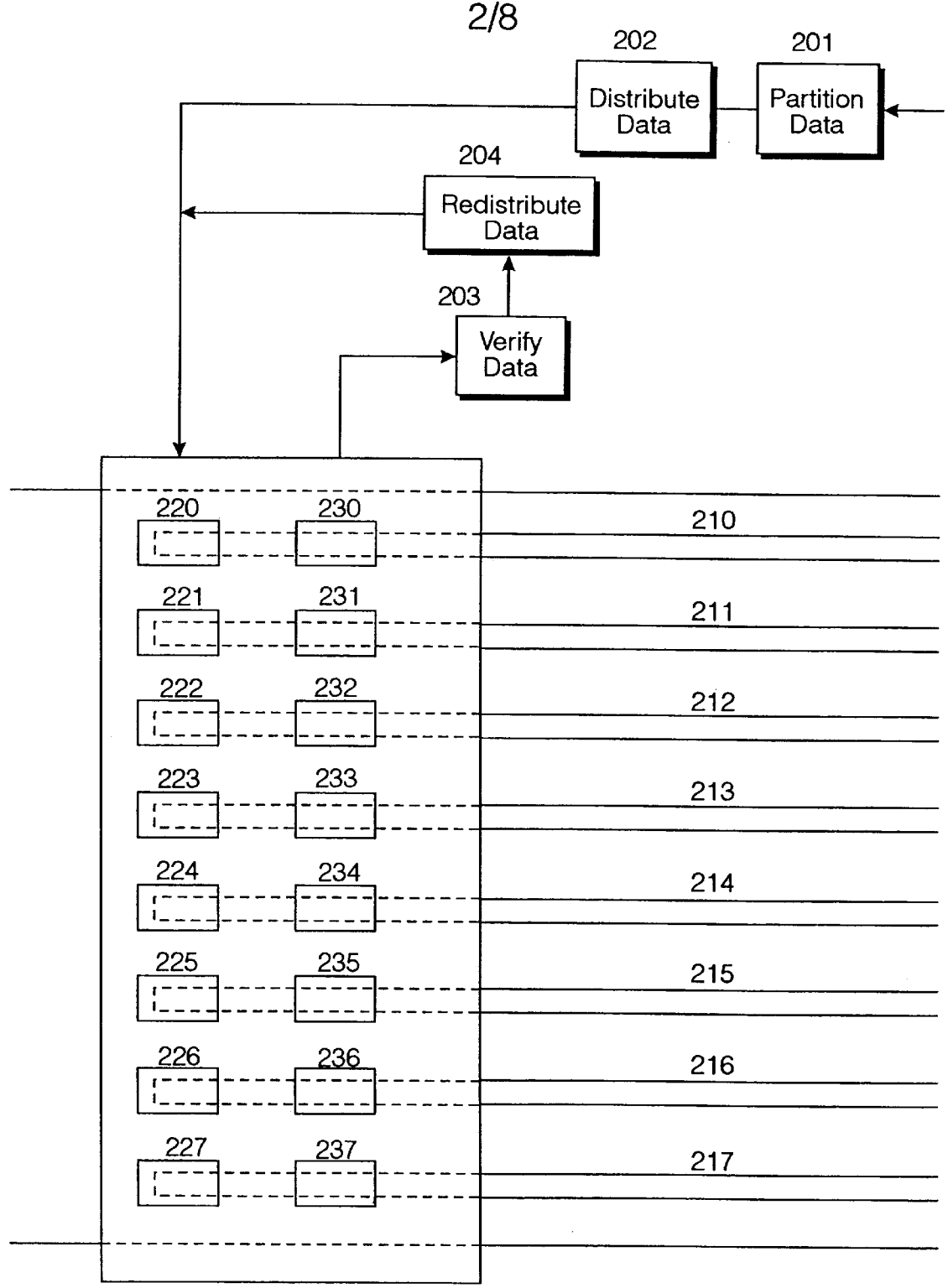
FIG. 2 illustrates schematically a general overview of a device configured to distribute a stream of data to a plurality of write heads and to write the data to a magnetic tape data storage medium.

Referring to FIG. 2 herein, there is illustrated schematically a data storage device capable of writing data to a data storage medium and reading the written data from the data storage medium, comprising: a device 201 which is operable to partition a stream of data from a host device into a plurality of codewords; a device 202 which is operable to distribute the codewords amongst a plurality of write heads; a plurality of write heads 220–227 which are operable to perform a write operation to write the codewords to a plurality of tracks of the data storage medium; a plurality of read heads 230–237 which are operable to perform a read operation to read the codewords from the plurality of tracks; a device 203 operable to verify if the codewords read from the plurality of tracks are incomplete. Device 204 re-distributes incomplete codewords originally written to the data storage medium in a different order amongst the plurality of write heads.

In one embodiment of the present invention, the line of 8 write heads are followed by a parallel line of 8 read heads. Each head is switchable to perform either as a read head or a write head. The state of each head is switched on every change of direction of the tape so as to ensure that the read head is always "downstream" of the write head with respect to the direction of movement of the tape past the heads. In a second embodiment of the present invention, the line of 8 write heads are located between two parallel lines of 8 read heads. The read head that is used to read the data from tape in any given write pass is chosen so as to ensure that the read head is always downstream of the corresponding write head irrespective of the direction of movement of the tape past the heads.

Figure 3:
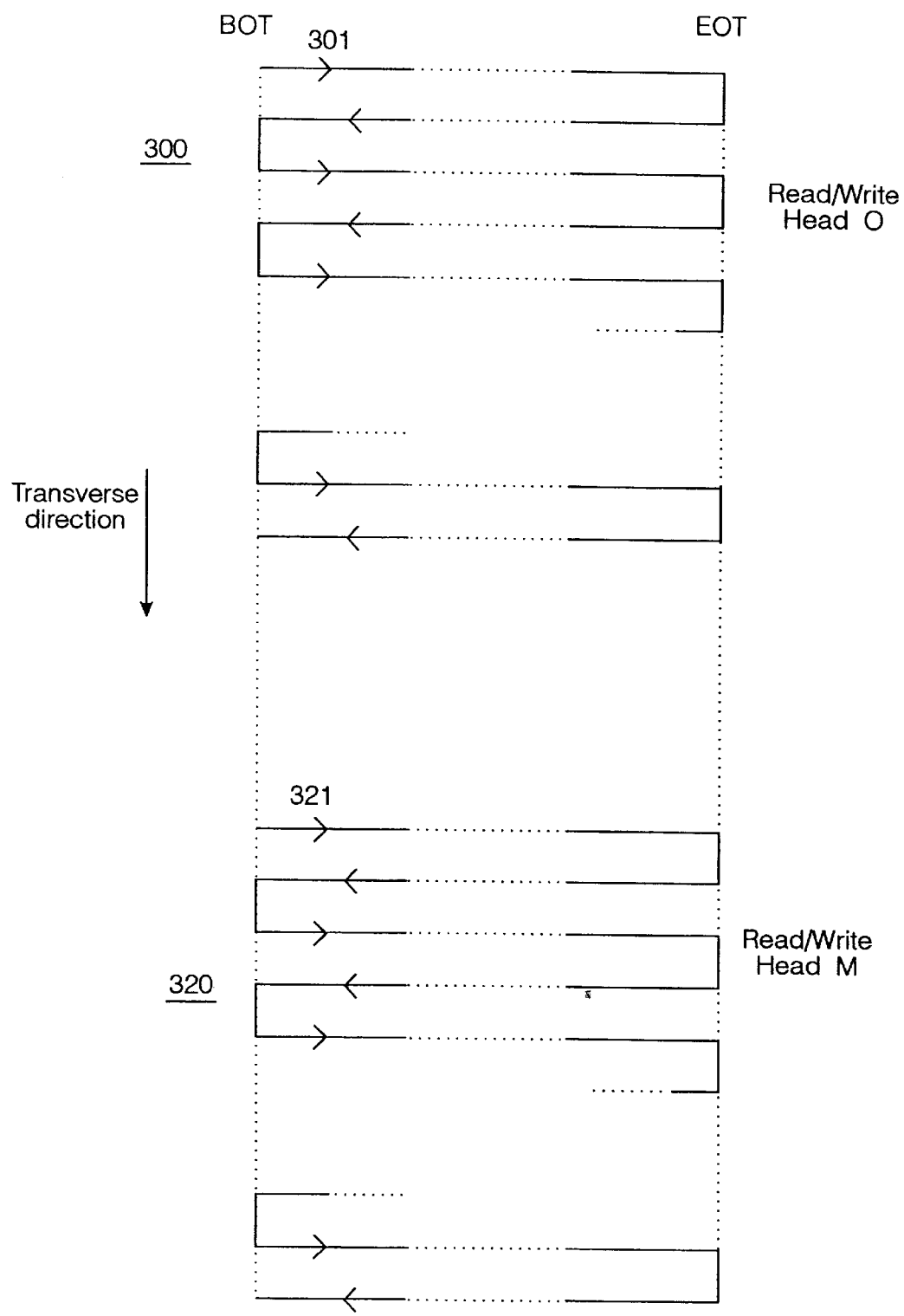
FIG. 3 illustrates schematically a layout of a band group comprising a plurality of physical data tracks recorded onto a magnetic tape data storage medium according to a specific method of the present invention.

Referring to FIG. 3 herein there is shown schematically the layout of a single band along a tape. Each band comprises a set of N tracks 301 formed during one write pass of the tape past one of a plurality M read/write heads. After recording one write pass along the length of the tape from the beginning of the tape (BOT) to the end of the tape (EOT), the plurality of read/write heads are moved in a transverse direction, with respect to the elongate direction of the tape, by a distance of the order 20 $\mu$m. Data is then written to the tape with the tape moving in the opposite direction to the previous write pass. The plurality of read/write heads trace a "serpentine" path on the tape 300–320. After each successive write pass the plurality of read/write heads are moved a further short distance of the order 20 $\mu$m in a transverse direction to the main length of the tape.

During the process of writing data to tape there is a risk that the data may not be correctly written to tape. This may occur, for example, if the coating of the tape has been damaged by a scratch. Should this occur it may not be possible to correctly recover the data from the tape.

According to the best mode presented herein, the data is read back off the tape immediately after having been written to tape during a same pass of the tape past the read/write heads. In this way the integrity of the data written to tape can be confirmed substantially at the same time as it is being written. If any of the data from one or more of the read/write heads has become corrupted on being written to tape, this is detected and the data can be rewritten at a point further along the main length of the tape.

Figure 4:
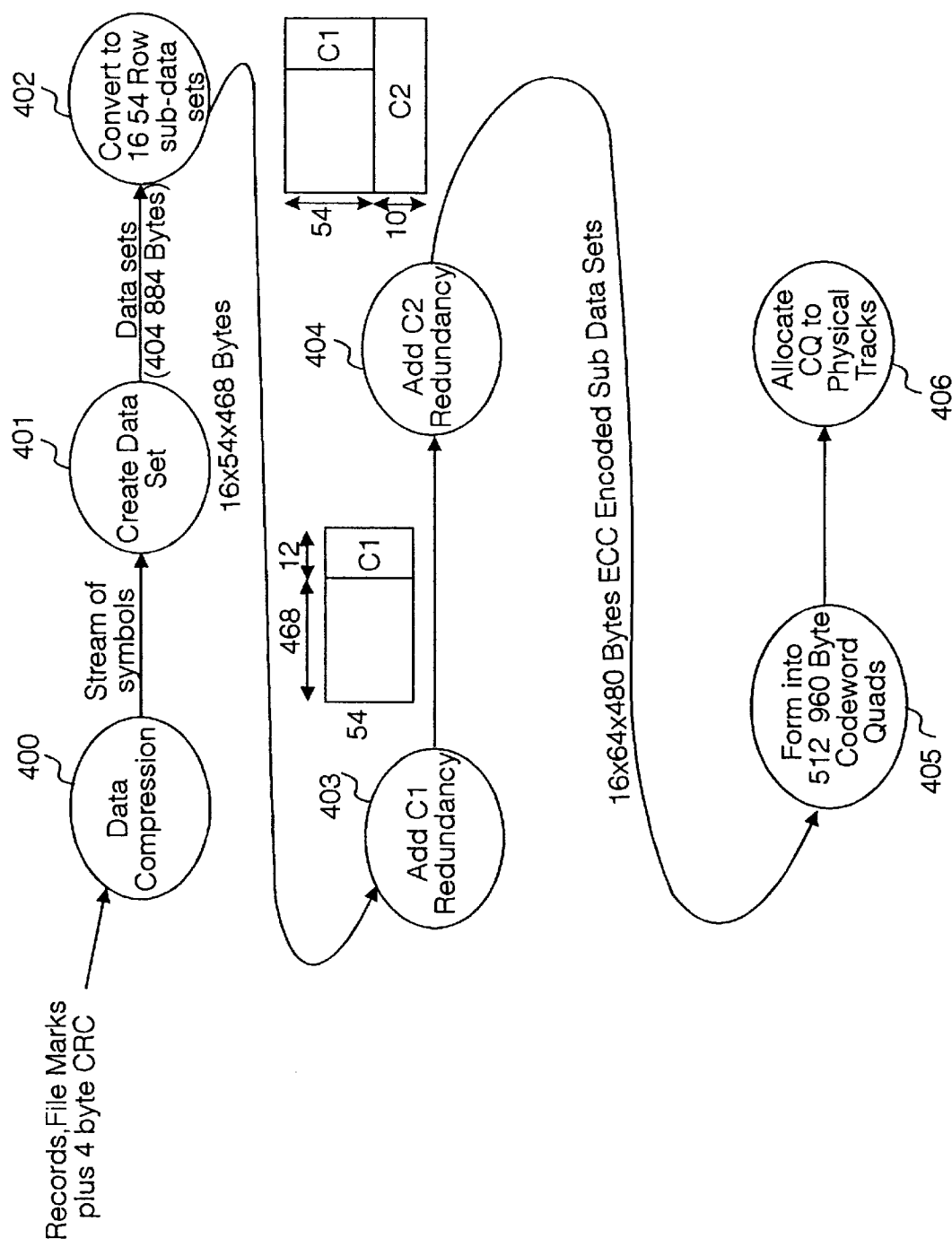
FIG. 4 illustrates schematically in general overview a process for redundancy coding and recording a byte stream of data from a host apparatus onto a magnetic tape data storage medium according to a specific implementation of the present invention.

Referring to FIG. 4 herein, there is illustrated an encoding method for encoding user data prior to recording the user data onto a plurality of physical data tracks as described hereinbefore.

The, data as supplied by the host device computer is in the form of a variable length record which may be separated by file marks and in the best mode presented herein may have a length of up to $2_{24}$_1 bytes. A 4 byte cyclic redundancy check (CRC) is added to the end of each record, forming a protected record. In step 400 a data compression algorithm compresses the protected records producing a stream of Symbols. In step 401 the Symbol stream is broken into data sets of 403884 bytes to which a 468 data set information table (DSIT) is appended toform a 404352 byte data set. In step 402 each data set is split into 16 sub-data sets each of 25272 bytes and each sub-data set is arranged into a 54 by 468 byte matrix arranged in rows and columns. In step 403 a (240, 234, 7) Reed-Solomon redundancy coding algorithms is applied to the 234 even numbered bytes in each row producing 6 C1 Error Correcting Code (ECC) bytes. These bytes are placed in the even number C1 parity locations for that row. Then the same Reed-Solomon code is applied to the 234 odd numbered bytes with resulting 6 C1 ECC bytes placed in the odd numbered C1 parity locations for that row. Each row of the matrix comprises one interleaved codeword pair of 480 bytes. The even numbered bytes form the first codeword of the codeword pair and the odd numbered bytes form the second codeword of the codeword pair. Thus 12 bytes of C1 parity information are appended to each row of the 54 by 468 byte matrices forming the 16 sub-data sets. In step 404, a (64, 54, 11) Reed-Solomon code is applied to each 54 byte column of the codeword pair matrix producing 10 C2 Error Correcting Code (ECC) bytes per column. The added 10 bytes of C2 ECC form ten additional codeword pairs. The resulting 64 by 480 byte matrices form ECC encoded sub-data sets each comprising 64 codeword pairs. An ECC encoded data set contains 491520 bytes comprised of 16 64×480 byte ECC encoded sub-data sets. Each row of each ECC encoded sub-data set is a 480 byte ECC encoded codeword pair. Thus there are 1024 ECC encoded codeword pairs per ECC encoded data set. In step 405, and referring to FIG. 5 herein, a codeword quad (CQ) is formed by combining a codeword pair header 500, a first codeword pair 501, a second codeword pair header 510 and a second codeword pair 511. The first and second codeword pairs in a codeword quad comprise the corresponding rows of the ECC coded sub-data sets 2R and 2R+1, where R takes the values 0 to 7. For example, the tenth codeword quad has a first codeword pair comprising the first row of sub-data set number 2 and a second codeword pair comprising the first row of sub-data set 3. The 1024 codeword pairs in the 16 sub-data sets form 512 codeword quads each of 960 bytes.

In step 406, codeword quads are allocated to each one of the plurality of read-write heads. In the best mode herein codeword quads are written simultaneously onto the tape in sets of 8 CQs, where for example 8 is the number of concurrent read/write heads each read/write heads each read/Write head allocated to a corresponding respective physical tape track. One CQ of each set is written concurrently by a respective one of the write heads. The set of a CQ is determined by the expression:

$$\text{Set\_Number} = \frac{(\text{CQ\_Number} - \text{Mod}(\text{CQ\_Number}, \text{N\_T}))}{\text{N\_T}} \quad (1)$$

where the Set_Number is a number of a set of CQs, and CO_Number is the number of the codeword quad to be allocated to the set, and N_T is the number of tracks simultaneously written in a write operation.

Each codeword quad is allocated to a particular active track where an active track is a track currently being written to by one of the plurality of read/write heads. The active tracks are numbered 0 through 7 and a codeword quad is allocated to a particular active track identified by a track number using the following expression:

$$\text{Track\_Number} = \quad (2)$$
$$\text{Mod}\left[\frac{(\text{CQ\_Number} - \text{Mod}(\text{CQ\_Number}, \text{N\_T}))}{\text{N\_T}}, \text{N\_T}\right]$$

where CQ_Number is the number of the codeword quad to be allocated to an active track and can take the values 0 to 511. The Mod function returns the integer remainder of a modulo division. For example Mod [N. 8] returns the integer values 0 to 7 for all integer values N. The above expression shall be referred to in the remainder of this description as expression (2).

The above expressions (1) and (2) are used in the default case, where no CQ sets are rewritten due to corrupted or poorly written CQ sets on the tape, and results in a write pattern as illustrated by example in FIG. 5 herein.

Referring to FIG. 6 herein which relates to an example where 8 tracks are written together, it is illustrated how codeword quads are distributed among active tracks in the case where no write errors occur. Tracks are represented as rows in FIG. 6, on a vertical axis, whilst successively written CQs are represented on a horizontal axis by their CQ numbers. The use of the above expression (2) ensures that C2 symbols from the same C2 codewords are contained in the codeword quads that are distributed across the available active tracks. In FIG. 6 C2 parity codeword quads are represented by the shaded blocks. Once the codeword quads have been allocated to the active tracks, the 8 codeword quads which are written to tape simultaneously are known as a CQ set (also known as a Logical Track Block). The allocated codeword quads are then processed through a data randomizer which acts on each codeword pair within each codeword quad. The randomized byte stream is then encoded by a run length limited coding algorithm (RLL). The RLL encoded byte stream has synchronization information prior to writing to tape forming a synchronized codeword quads (SCQ). CQs which contain symbols for any specific C2 codeword are written physically in a diagonal line across the physical track on tape, as illustrated by shaded CQ boxes in FIG. 6 herein. The shaded boxes represent the CQs written to tape which contain the symbols from a single C2 codeword.

In order to maintain the integrity of the data written to tape, each of the plurality of read/write heads are configured such that data can be read back off an active track immediately after it has been written to that track. Write and Read operations occur simultaneously as the tape passes the read/write heads.

According to one aspect of the present invention there is provided a method of rewriting an CQ set which has been incompletely or badly written to tape wherein the order of the codeword quads within that SCQ set are rotated such that no rewritten codeword quad occupies the same active track as the previous, badly written, data.

Figure 7:
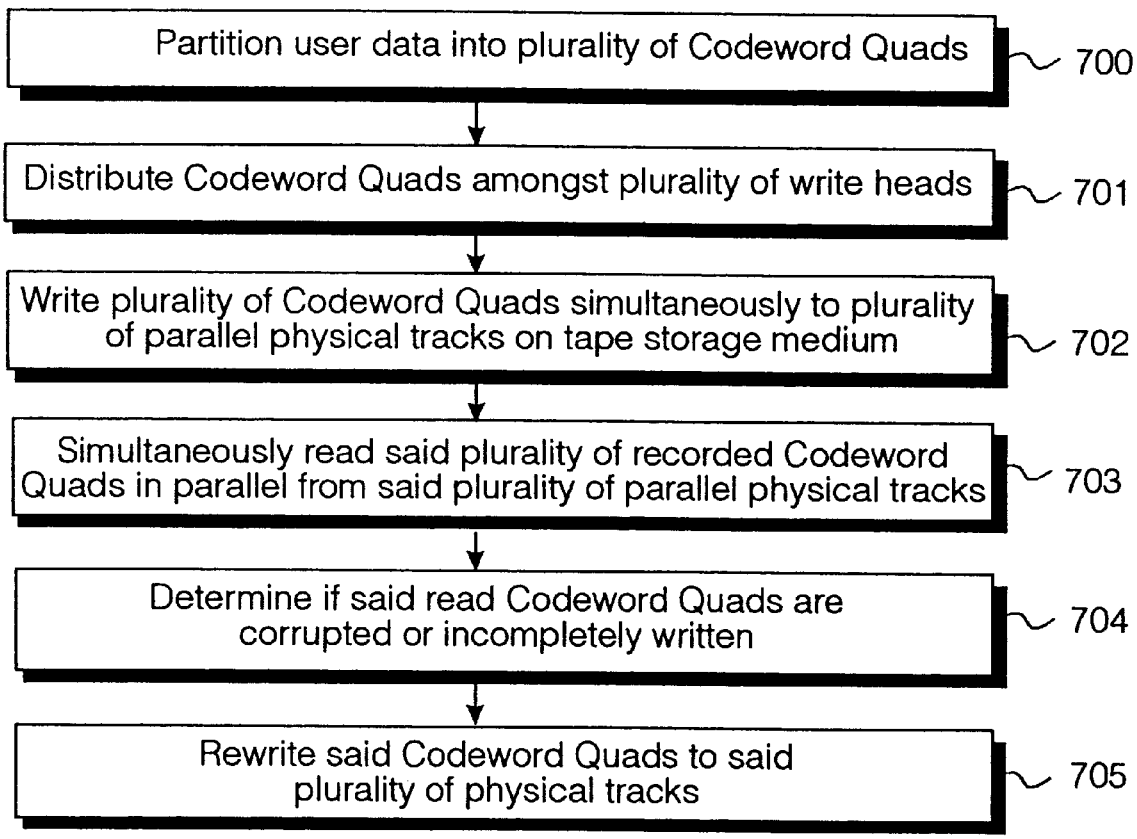
FIG. 7 is a schematic illustration of generalized process steps for writing data to a data storage medium, and rewriting any corrupted or incorrectly written data, during the data writing operation.

Referring to FIG. 7 herein, there is illustrated schematically general process steps for rewriting corrupted codewords to tape, immediately after, or substantially simultaneously, with their initial writing to tape, during a same pass of the tape past the read/write heads. In step 700, user data is partitioned into the plurality of codewords as described hereinabove. In step 701, the codewords are distributed amongst the plurality of write heads as described hereinabove. In step 702, the plurality of codewords are simultaneously written to a plurality of parallel physical tracks on the tape data storage medium, resulting in a sequence of codewords written on tape, an example of which is given in FIG. 6 herein. As the tape passes the read/write heads, codewords are continuously written to tape. Simultaneously with the writing of codewords to tape, as the tape passes the read head during the same pass of the tape past the read/write heads, the recently recorded codewords are read from the tape in parallel from the plurality of parallel physical tracks onto which they have been recorded, illustrated instep 703. In step 704, the read codewords are verified as being accurately recorded onto the tape. If, during the verification process, it is determined that the codewords as read from tape do not correspond with the codewords which were sent to the write head (i.e. the data has been incompletely written, or for some reason has been corrupted on the tape), then in step 705, the codewords affected by the corruption/incomplete writing are rewritten onto the plurality of tracks. Since new codewords are arriving at the write head during the read operation and the tape movement is continuous, the codewords which are to be, rewritten are interleaved with current codewords which are being written by the write heads. The signals sent to the write heads comprise current codewords, interleaved with the re-write codewords. Interleaving of current codewords and re-write codewords may be effected by buffering the current codewords and re-write codewords together prior to recording on tape. Interleaving of the re-write codewords and the current codewords occurs in a buffer of the data storage device, arranged according to a microprocessor operated algorithm, operating as described hereunder.

Figure 8:
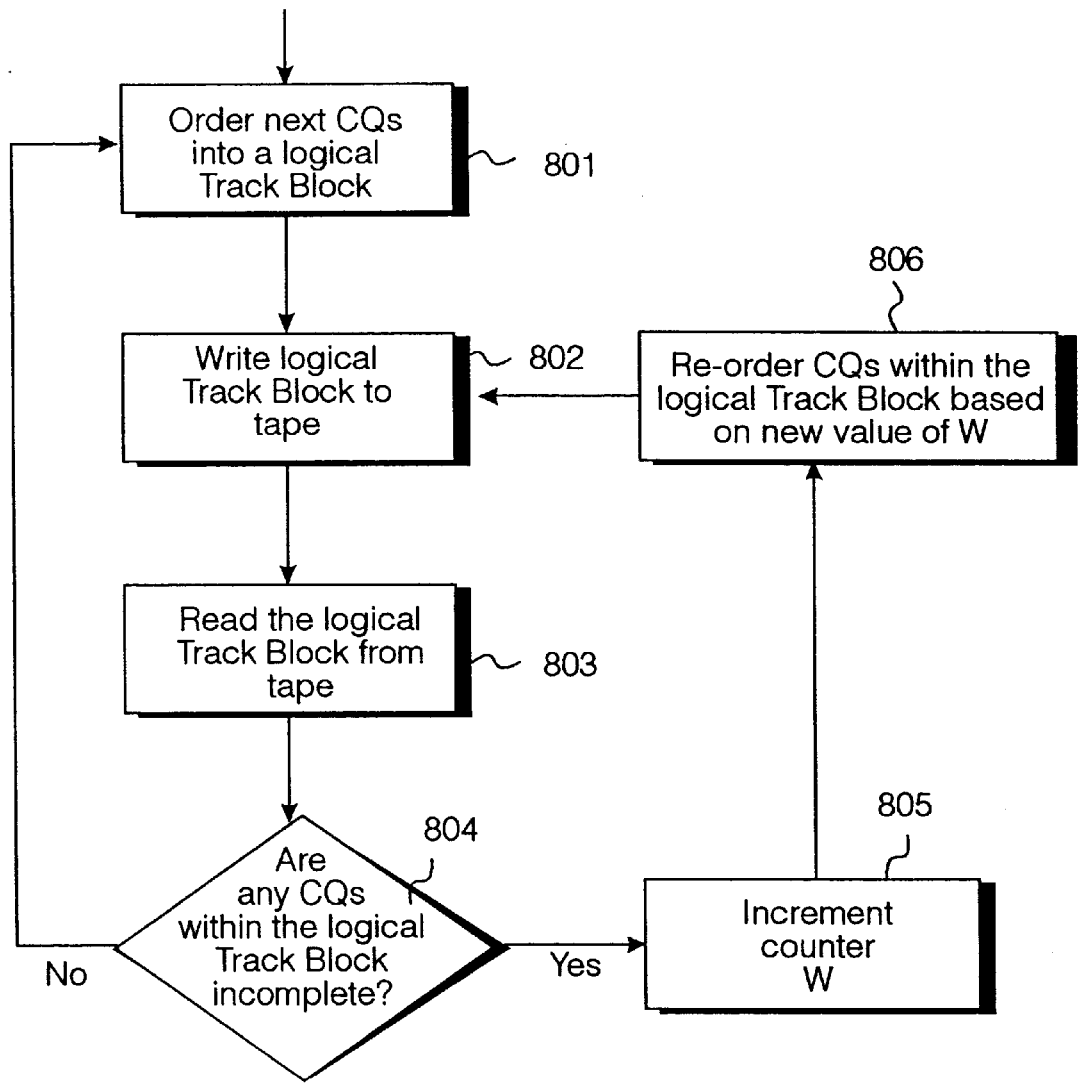
FIG. 8 illustrates schematically steps for writing data to tape, verifying that the data has been correctly written and rewriting corrupt data according to the specific implementation of the present invention.

Referring to FIG. 8 herein there are illustrated steps for writing a CQ set to a plurality of tracks, verifying that the data has been correctly written and rewriting badly written CQ sets. In step 801, the codeword quads forming one CQ set are allocated to particular active tracks using equation (2) of this description. In step 802, the codeword quads comprising the logical track block are written to tape. In step 803, the logical track block is read back off tape. In step 804, the data read off tape is checked for completeness. If no error has occurred on writing the data to tape, then the next codeword quads are allocated to the active tracks and steps 802, 804 are repeated. However, if a write error has occurred, then step 805 character W is incremented by 1. In step 806, the original codeword quads written to tape in step 802 are allocated to new active tracks using equation (3) with the incremented value of the counter represented by W. The reordered data is rewritten to tape in step 802 and steps 803 and 804 are repeated.

Each CQ set can be rewritten multiple times. In the example herein, the maximum number of CQ sets that may be rewritten within a single data set is 128. When an CQ set is rewritten, any CQ sets that have been written between the original and the rewritten version, do not need to be rewritten themselves unless one of the following conditions apply:

An error is detected when they themselves are recorded.

They have a data set number that is higher than that of the CQ set that is being rewritten.

If an error is detected by read while write verification when recording an CQ set, then that CQ set is rewritten further down the tape. The original, badly written, CQ set is left on the tape as written, (i.e. the tape is not re-wound to re-record over the incomplete or badly written data, but rather the tape passage continues uninterrupted and the corrupted data CQs are re-written). In the specific example described herein, no more than 6 other CQ sets may be written between the point at which the error was detected and when the CQ set in error is rewritten. The number of other CQ sets written between the badly written CQ set and its rewritten version is fixed by the precise physical configuration of the read/write heads. The number of intermediate CQ sets also depends on the latency inherent to the read/write hardware of the device.

When a CQ set is repeated due to a detected write error, read whilst recording, the CQ within the affected CQ set in which the error occurs may be rotated around the tracks so that they do not appear on the same track as the previous time that they were written.

The effect such a rotation, the track number for each codeword quad in an SCQ set is given by the following equation:

$$\text{Track\_Number} = \text{Mod}\left[\frac{(\text{CQ\_Number} - \text{Mod}(\text{CQ\_Number}, \text{N\_T}))}{\text{N\_T}} - W, \text{N\_T}\right] \quad (3)$$

where W is an arbitrary, but different, number between successive writings of the same SCQ set, W represents the state of a character which cycles through a sequence of integers 0 to M−1, where M represents the number of active tracks which can be written to simultaneously.

Referring to FIG. 9 herein there is shown an example of such a rotation in which a number of CQ sets are rewritten because an error was detected while the CQ sets were being written. The notation $K^x$ indicates that an error was detected while writing the CQ set K. The notation K' indicates that the CQ set K was rewritten once. The notation K" indicates that the CQ set K was rewritten twice, etc. N is the set number within the data set. Physical tracks 0–7 are represented as rows in FIG 9, whilst written CQ sets are represented by W numbers extending horizontally.

Referring again to FIG. 2 herein, a data storage medium recorded with a set of Codeword Quads which have been erroneously written, and then re-written according to the above described method contains a set of Codeword Quads comprising a first logical track block written at a first position along a length of the tape, and the plurality of codewords comprising the first logical track block also re-written at a second position, further along the tape, at the second position, the Codeword Quads being reordered amongst the set of physical tracks 210–217 according to the expression (3) hereinabove. Reading of data recorded onto a magnetic tape in accordance with the above described method comprises passing the elongated tape past a plurality of read heads, such that all Codeword Quads of a logical track block are read simultaneously. If Codeword Quads are detected as having been erroneously written, the data are recovered from the same logical track block and re-recorded further along the tape, in a second order as determined by the expression (3) above.

What is claimed is:

1. A method of writing data to a data storage medium, the method comprising the steps of:

partitioning said data into a plurality of codewords;

distributing said codewords amongst a same plurality of write heads;

performing a write operation to write said codewords substantially simultaneously to a same plurality of physical tracks of said data storage medium;

performing a read operation to read said codewords from said plurality of physical tracks;

if said codewords read from said plurality of tracks contain errors, then re-distributing said codewords originally written to said data storage medium in a different order amongst said plurality of write heads; and performing a re-write operation to re-write said re-distributed codewords to a same plurality of physical tracks of said data storage medium.

2. The method as claimed in claim 1, wherein said data storage medium comprises an elongate tape, and said write operation comprises a write pass along a length of said tape.

3. The method as claimed in claim 1, wherein said step of distributing codewords amongst a plurality of write heads comprises distributing a plurality of Codeword Quads amongst said plurality of write heads.

4. The method as claimed in claim 3, wherein said step of distributing said plurality of Codeword Quads amongst said plurality of write heads comprises:

allocating each of said plurality of Codeword Quads to a corresponding write head.

5. The method as claimed in claim 4, wherein said plurality of Codeword Quads are arranged into a logical track block for writing to said data storage medium simultaneously, and a position of an individual Codeword Quad within said logical track block is indicated by an integer number.

6. The method as claimed in claim 1, wherein said plurality of codewords are arranged into a plurality of Codeword Quads and said step of performing a write operation comprises simultaneously writting a plurality of Codeword Quads onto said data storage medium through said write heads.

7. The method as claimed in claim 1, wherein:

said codewords are arranged into a plurality of Codeword Quads;

a plurality of said Codeword Quads to be written simultaneously are arranged into a logical track block;

said Codeword Quads of each said logical track block are allocated to corresponding ones of said plurality of write heads in a first order; and if an error is detected in said Codeword Quads once written to said data storage medium, said Codeword Quads of said logical track block are re-allocated to said write heads in said different order.

8. The method as claimed in claim 7, wherein a position of said Codeword Quads within said logical track block is denoted by an integer number.

9. The method as claimed in claim 7, wherein each of said Codeword Quads of said logical track block corresponds with a respective one of said of plurality write heads.

10. The method as claimed in claim 7, wherein said first order is determined by the expression:

$$\text{Track\_Number} = \text{Mod}\left[\frac{(\text{CQ\_Number} - \text{Mod}(\text{CQ\_Number}, \text{N\_T}))}{\text{N\_T}}, \text{N\_T}\right]$$

where the Track_Number represents a number of an element of a logical track block, CQ_Number represents a number of a set of four codewords, Mod represents the integer remainder of a modulo division; and N_T represents a number of tracks simultaneously written.

11. The method as claimed in claim 1, wherein said different order is determined by an expression:

Track_Number =
$$\text{Mod}\left[\frac{(\text{CQ\_Number} - \text{Mod}(\text{CQ\_Number}, \text{N\_T}))}{\text{N\_T}} - W, \text{N\_T}\right]$$

where the Track_Number represents a number of an element of a logical track block, CQ_Number represents a number of a set of four codewords, Mod represents the integer remainder of a modulo division; W represents the state of a character which cycles through a sequence of integers 0 to M−1, where M represents the number of active tracks which can be written to simultaneously; and N−T represents a number of tracks simultaneously written.

12. The method as claimed in claim 1, wherein said data storage medium comprises a magnetic data storage medium.

13. A data storage device comprising at least one read element and at least one write element, said device comprising means capable of writing data to a data storage medium and means capable of reading said written data from said data storage medium, wherein:
said write means is operable to partition said data into a plurality of codewords;
said write means is operable to distribute said codewords amongst a same plurality of write heads;
said write means is operable to perform a write operation to write said codewords substantially simultaneously to a same plurality of physical tracks of said data storage medium;
said read means is operable to perform a read operation to read the codewords from said plurality of tracks;
if said codewords read from said plurality of tracks are incomplete, then said device is operable to re-distribute said codewords originally written to said data storage medium in a different order amongst said plurality of write heads; and
said device is operable to perform a re-write operation to re-write said re-distributed codewords to a same plurality of physical tracks of said data storage medium.

14. A data storage medium comprising a plurality of codewords in a plurality of track blocks, each track block comprising a plurality of codewords,
a plurality of the codewords belonging to a first logical track block being in a set of tracks in a first order; and
said plurality of codewords being in said plurality of tracks in a second order, at a second position on said plurality of tracks, if said plurality of codewords have been erroneously written at a first position occupied by said logical track block.

15. The medium of claim 14, wherein the medium is an elongated medium.

16. The medium of claim 14 wherein the medium is an elongated magnetic tape.

17. A method of writing data to a data storage medium, the method comprising the steps of:
partitioning said data into a plurality of codewords;
distributing said codewords amongst a same plurality of heads;
performing a write operation to write said codewords substantially simultaneously to a same plurality of physical tracks of said data storage medium;
performing a read operation to read said codewords from said plurality of physical tracks;
if said codewords read from said plurality of tracks contain errors, then re-distributing said codewords originally written to said data storage medium in a different order amongst said plurality of heads; and
performing a re-write operation to re-write said re-distributed codewords to a same plurality of physical tracks of said data storage medium.

18. A data storage device comprising at least one read/write element, an arrangement including the at least one read/write element for writing data to a data storage medium and for reading said written data from said data storage medium:
said arrangement while writing the data being arranged for (a) partitioning said data into a plurality of codewords, (b) distributing said codewords amongst a same plurality of heads for writing said distributed codewords onto the medium, and (c) writing said codewords substantially simultaneously to a same plurality of physical tracks of said data storage medium;
said arrangement while reading the data being arranged for (a) reading the codewords from said plurality of tracks, (b) re-distributing said codewords originally written to said data storage medium in a different order amongst said plurality of write heads in response to said codewords read from said plurality of tracks are incomplete, and (c) re-writing said re-distributed codewords to a same plurality of physical tracks of said data storage medium.

* * * * *